United States Patent [19]

Lindblad

[11] 4,187,925
[45] Feb. 12, 1980

[54] DEVICE FOR STRETCHING A BAND FORMING PART OF A SAFETY BELT FOR VEHICLES

[75] Inventor: Oskar L. Lindblad, Vargarda, Sweden

[73] Assignee: Autoliv AB, Vargarda, Sweden

[21] Appl. No.: 817,866

[22] Filed: Jul. 21, 1977

[51] Int. Cl.² .................... B60R 21/10; A62B 35/00
[52] U.S. Cl. ..................... 180/268; 242/107.4 R; 280/806; 297/480; 307/10 SB
[58] Field of Search .......... 280/744, 745, 746; 242/107.4 R, 107.4 A, 107.4 B; 180/82 C; 297/588; 307/10 SB

[56] References Cited

U.S. PATENT DOCUMENTS

| 2,883,123 | 4/1959 | Finnigan | 242/107.4 R |
| 3,077,324 | 2/1963 | Strickland | 242/107.4 R |
| 3,970,266 | 7/1976 | Doin | 242/107.4 R |
| 4,056,242 | 11/1977 | Herrmann | 242/107.4 R |

FOREIGN PATENT DOCUMENTS 2442745 3/1976 Fed. Rep. of Germany ........ 180/82 C

*Primary Examiner*—Joseph F. Peters, Jr.
*Assistant Examiner*—Donn McGiehan

[57] ABSTRACT

A device for tightening a safety belt for vehicles provided with an inertial switch adapted to sense abnormal changes in the movement of the vehicle, a motor being arranged to activate the safety belt by means of a cylindrical inertial body connected thereto. The body under normal operating conditions is under rotation, and activating means is also provided to connect with the inertial body to tighten the safety belt when such abnormal changes in movement take place, thereby utilizing the energy of the rotating body for tightening of the belt.

10 Claims, 8 Drawing Figures

U.S. Patent  Feb. 12, 1980  Sheet 1 of 3  4,187,925

DEVICE FOR STRETCHING A BAND FORMING PART OF A SAFETY BELT FOR VEHICLES

The present invention relates to a device for stretching a band forming part of a safety belt for vehicles comprising a power means, which can be activated by means of a device sensing abnormal changes in the movement of the vehicle, which power means is arranged in activated condition to shorten the active portion of the belt.

It is a principal object of the invention to provide a mechanism of the kind mentioned, which is reliable in use.

The invention is substantially characterized by an inertial body forming part of the power means assembly, which body under normal operating conditions of the safety belt is rotating, activating means in addition being incorporated, which are arranged to bring about a driving connection between the inertial body and an element serving the purpose to effect shortening of the band of the safety belt, when abnormal changes in movement take place, in order to utilize the energy of the rotation movement of the inertial body for stretching tightening of the band.

Figure 3:
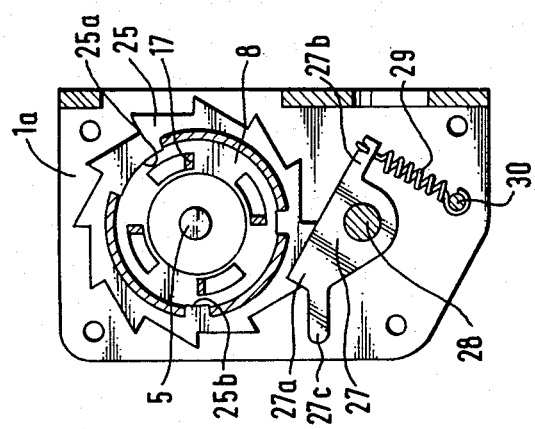
Figure 1:
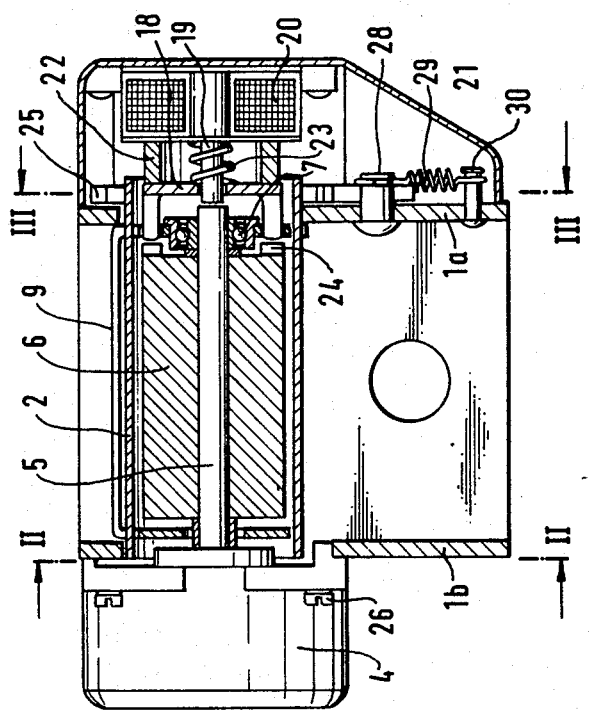
Figure 2:
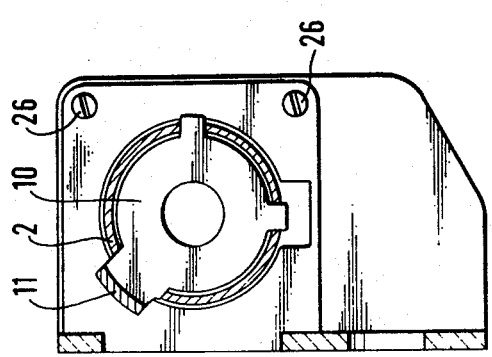
Figure 4:
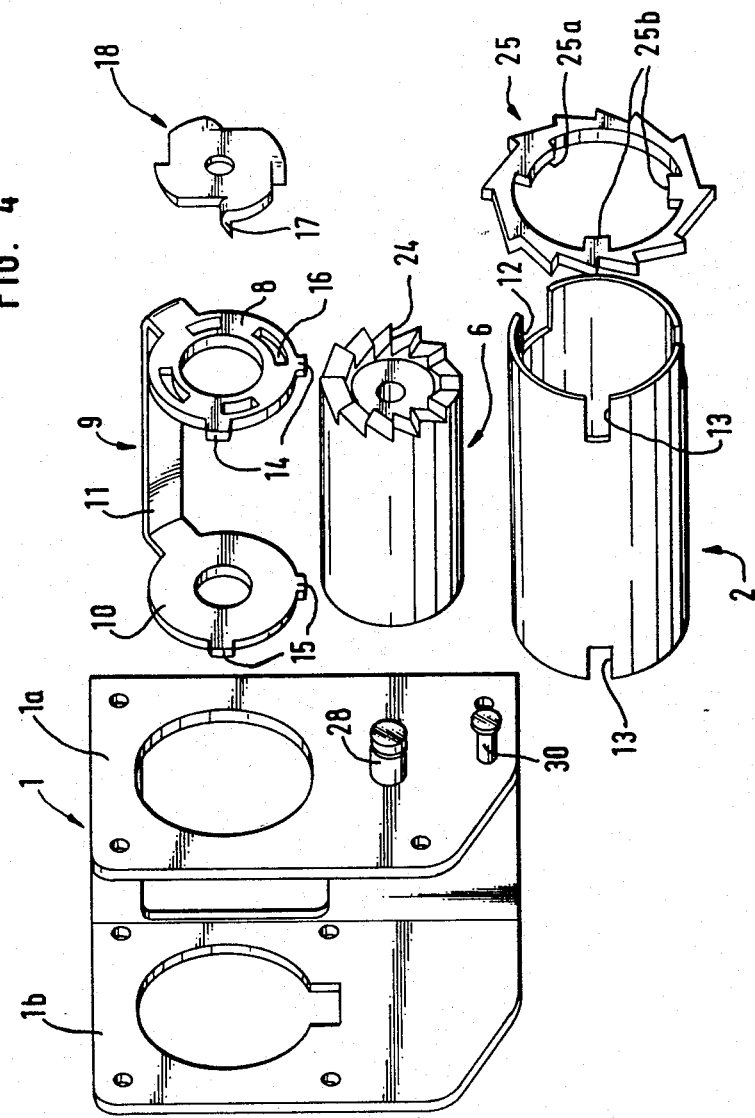
Figure 6:
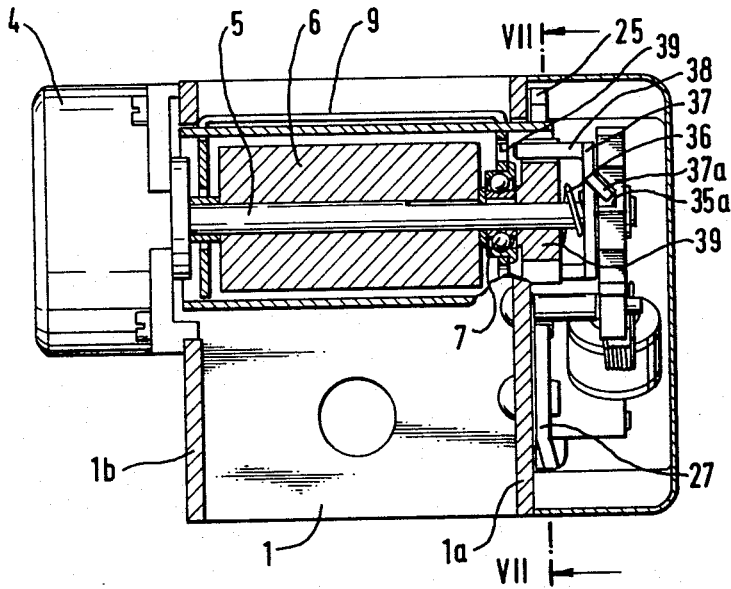
Figure 7:
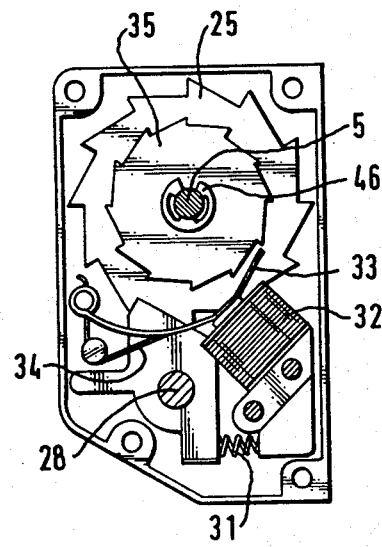

In the following two examples of embodiments of the object of the invention are described, reference being made to the accompanying drawings, in which the first example is illustrated in the FIGS. 1-5, and the second example is illustrated in the FIGS. 6 and 7, the FIG. 1 being a view of a longitudinal cross section through the stretching device designed according to the invention, while FIG. 2 shows a cross-section approximately along the line II—II of FIG. 1, FIG. 3 is a cross-section approximately along the line III—III of FIG. 1, FIG. 4 is an exploded sketch, which shows certain details forming part of the device illustrated in the FIGS. 1-3, FIG. 5 is a view of a band core comprising some of the details illustrated in FIG. 4 with a band of the safety belt laid around the same, FIG. 6 is a cross-section corresponding to FIG. 1 through the device according to the second example of embodiment, and FIG. 7 is a cross-section along the line VII—VII of FIG. 6.

FIG. 8 is a schematic view of an inertial switch for detecting a sudden change in movement of the vehicle and the electrical circuit connected thereto.

Figure 5:
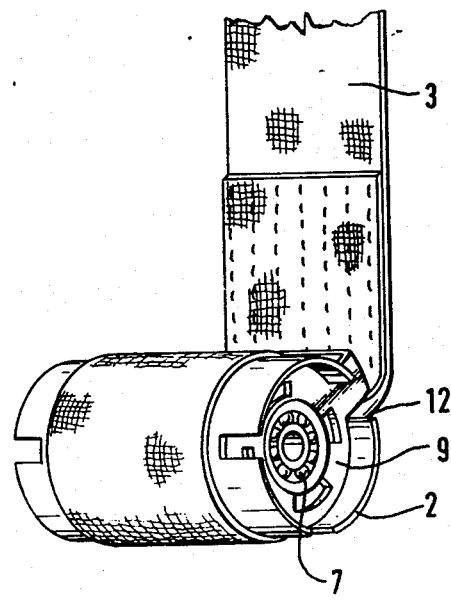

In the embodiment according to the figures of the drawings 1-5 the stretching device comprises a cylindrical winding-up sleeve 2 for the band, which is rotatably mounted in a stand 1, which can be attached to the car body, around which wind-up sleeve a belt band 3 forming part of the safety belt in question in mounted condition of the device is laid, as is evident from FIG. 5. An electric driving motor is indicated at 4, and the outgoing shaft 5 of this motor extends inside and coaxially to the winding-up sleeve 2 designed as a tube. An inertial cylindrical body 6, the diameter of which is somewhat smaller than the inner diameter of the sleeve 2, is pressure fitted on the motor shaft 5, so that the body of inertia can rotate freely inside said sleeve. A ball bearing 7 is pressured fitted on the free end of the motor shaft, and said ball bearing is pressed into one washer-shaped end portion 8 of a yoke 9, the other washer-shaped end portion 10 of which is located on the side of the body 6 facing the motor 4. Both the end washers of the yoke are interconnected by means of a bridge portion 11, which extends from the washers in radial outwards direction through openings 12 of the two ends of the sleeve 2, and which on the outside of the sleeve extends parallel to the same forming a carrier for the belt band 3 laid round the tube, said band being laid round the tube below the bridge portion 11. The two end washers 8 and 10 exhibit an outer diameter, which substantially coincides with the inner diameter of the sleeve, the yoke 9 being supported by the sleeve by the position of the washers inside the same. The yoke is prevented from rotating relative to the sleeve by the stops shaped by the lateral edges of the openings 12. The openings 13, through which additional radial projections 14 and 15 of the washers protrude, also have the same function. The washer 8 is moreover provided with a number of elongated arcuate slots for holes 16, in which axially directed teeth 17 of a toothed wheel 18 are introduced, which is rotatably journalled on the free end of a shaft 19, which is directed towards the free end of and coaxial with the motor shaft 5. A magnetic coil of an electromagnet mounted in an end housing 21 is indicated at 20, the core of said electromagnet being indicated at 22. The core 22 is of annular shape. A pressure spring 23 abuts upon the outside of the tooth wheel 18 and as seen in FIG. 1 tends to displace the tooth wheel 18 to the left into engagement with a toothing 24 provided on the end of the body 6 of inertia. A ratchet ring mounted around the end portion of the sleeve 2 located outside of the journalling portion 1a of the stand 1 is indicated at 25. In order to prevent the ratchet ring from rotating on the sleeve, shoulders 25a and 25b provided on the inside of the ring extend into the recesses 12 and 13 respectively provided in the sleeve. In addition the ratchet ring is locked against axial displacement by the outer terminal edge of the sleeve being slightly upset. The motor 4 is by means of screws 26 attached to the journalling portion 16 of the stand 1. A pawl 27 cooperates with the ratchet ring 25, said pawl being pivotably journalled on a pivot 28. The pawl 27 forms a double armed lever, one arm 27a of which cooperates with the ratchet wheel 25, while the other arm 27b is under the bias of a tension spring 29, of which one end is attached to the stand by means of a pin 30. The spring 29 tends to move the pawl to engage the tooth ring 25, whereby these elements form a one way block, which is manually released by moving the pawl away from the tooth ring, preferably by gripping the same at its projection 27c with a screwdriver or similar. A switch forms part of the circuit to the magnetic coil 20, which switch can be actuated from a device, which senses abnormal changes in the movement of the vehicle as for example, when a collision takes place, whereby the switch is actuated in such a manner that the current in the circuit is interrupted, when the change of speed in question occurs.

The device illustrated in the FIGS. 1-5 functions in the following manner:

When the belt is in normal use, the circuit to the electric motor 4 as well as to the electromagnetic coil 20 is closed by means of master switch 45; whereby the inertial body 6 rotates freely inside the sleeve, which is not moving. The free rotation of the inertial body is permitted on account of the electromagnet keeping the tooth wheel 18 pulled in a direction away from the toothing of the body 6. However, in this position the teeth 17 of the tooth wheel remain in the elongated recesses 16 of the washer 8 at their rear edge, in the direction of rotation. When a sudden change of the movement takes place, the circuit to the electromagnet 20 or 32 and the electric motor 4 is interrupted, from a source of power 46 by an inertial switch 47 (FIG. 8) comprising a pair of contact members 47a and 47b which are electrically bridged by a ball member 47c, the bridge contact being interrupted when predetermined velocity changes in the vehicle occur whereby the pressure spring 19 presses the teeth of the tooth wheel 18 into engagement with the body 6, whereby the tooth wheel is brought to rotate together with the body 6. Due to the elongated design of the openings 16 the teeth of the ratchet wheel can engage firmly the toothing of the body 6, before said teeth strike against the terminal front edges of the openings 16, in the direction of rotation and thereby carry with them the carrier yoke in the rotating movement. This is because the teeth 17 are permitted to move within the openings 16, thereby providing sufficient time for engagement with teeth 24 before the teeth 17 strike against the edges of the openings. In connection with this rotating movement also the sleeve 2, serving the purpose of means for winding up and tightening the band, is carried along, whereby a winding-up of the band on said sleeve is brought about as long as there is any kinetic energy left in the body 6. In connection with the stretching of the band brought about thereby, the pawl 27 cooperates with the tooth ring 25 and prevents the same from making a retrograde rotation. The circuit to the electric motor 4 can suitably be arranged in such a manner that the motor can start only after the magnet 20 has released the ratchet 18. In order to make possible that the body 6 has time to come to a standstill, when the motor is halted in normal manner, for example, when taking-off the safety belt, a device can be provided in the circuit to the electromagnet 20, which device interrupts the circuit with a delay, whereby the ratchet wheel 18 is retained in its free position for some time after the interruption of the circuit of the motor has taken place.

Without departing from the fundamental idea of the invention the motor can be of another kind than an electric motor. By way of example it can be arranged for vacuum drive. The ratchet wheel 18 can likewise be guided by a vacuum driven guiding means.

In the embodiment illustrated in the FIGS. 6 and 7 the details, which correspond to parts in the example of the embodiment described above are given the same reference numbers as in said example, i.e. the motor is indicated with 4, its outgoing shaft is indicated with 5, the inertial body is indicated at 6, the outer shaft bearing is indicated with 7, and the stand is indicated at 1. The journalling portions of the stand as was the case in the preceding example, are indicated at 1a and 1b. In the illustrated embodiment also the tooth ring is indicated at 25 and the pawl cooperating with the same is indicated at 27'. However, the pawl 27 like a few of the other details exhibit a somewhat different shape compared to the pawl 27' of the previously described embodiment. However, the spring 31' actuating the pawl in this embodiment is a pressure spring. The pin on which the pawl is journalled is indicated at 28 as was the case in the preceding example. An electromagnet, which actuates a second pawl 33, which is biassed by a spring 34, which tends to move the same into engagement with a tooth wheel 35, which is mounted on the shaft 5 of the motor and locked against axial displacement by means of a circlip 46, is indicated at 32. The tooth wheel 35 is rigidly connected with the motor shaft 5. A coupling piece 37 corresponding to the tooth wheel 18 of the preceding example is by means of a pressure spring 36 pressed against the side of the tooth wheel facing the motor 4, said coupling piece 37 in this embodiment, however, normally being carried along with the motor shaft 5 in its rotating movement. The coupling piece 37 exhibits an oblique flap 37a, which engages a corresponding recession 35a of the tooth wheel 35. The coupling piece 37 moreover exhibits a number of axially extending fingers 38, which extend through a guiding element 39, which likewise is supported by the motor shaft 5. The coupling piece 37 as well as the guiding element 39 are rotable relative to the motor shaft.

When an abnormal change in speed of the vehicle takes place, the electromagnet 32 will be without current, which means that the pawl 33 under bias of the spring 34 will be brought into engagement with the tooth wheel 35 and brake this wheel, whereby the relative movement between the tooth wheel and the coupling piece 37 has as a consequence that the flap 37a slides out of the recess 35a against bias of the pressure spring 36. This in its turn results in an axial displacement of the fingers 38 into engagement with terminal openings 40 of the carrier yoke 9. As was the case with the yoke 9 according to the preceding example, the openings 40 are suitably of an elongated arcuate shape in the circumferencial direction, so that the fingers will get a secure grip before they strike against the terminal front limits of the openings, as counted in the direction of rotation. The function is for the rest similar to the function, which has been described in connection with the preceding example of embodiment, because of which any repetition thereof is not deemed necessary.

The invention is not limited to the embodiments described above and illustrated in the drawings, but the means can be varied as to their details within the scope of the following claims without therefore departing from the fundamental idea of the invention.

By the invention one has obtained a stretching device, which with respect to its design is comparatively simple, and wherein no parts require a substitution after the device has been activated.

I claim:

1. In a device for tightening a safety belt for vehicles having power means activated by means for sensing abnormal changes in the movement of the vehicle, which power means upon activation will tighten the belt, the improvement comprising an inertial body member forming part of the power means, which body member under normal operating conditions of the safety belt is in a rotating condition, rotatable tightening means to tighten said belt upon abnormal changes in the movement of the vehicle, coupling means activated by said sensing means for connecting said rotating inertial body to said rotatable tightening means to tighten the safety belt when said abnormal changes in movement take place, thereby utilizing the energy of the rotating inertial body member for tightening of the belt.

2. A device according to claim 1, wherein said rotatable tightening means comprises a cylindrical wind-up sleeve surrounding said inertial body, which sleeve when coupled to said rotating inertial body member will wind up the belt on the sleeve.

3. A device according to claim 2, wherein the coupling means is located outside of the ends of said inertial body member and the wind-up sleeve for the belt, which are conterminous with each other.

4. A device according to claim 3, wherein the coupling means comprises an element provided with holes rigidly connected with the wind-up sleeve for the belt and arranged to be coupled to the inertial body member through axially extending fingers engageable with said holes.

5. A device according to claim 4, wherein said coupling means is displaceable by an electromagnet actuated by a switch, which in turn is actuated by said means for sensing abnormal changes in the movement of the vehicle.

6. A device according to claim 4, wherein the element provided with holes is further provided with a terminal washer on a yoke which extends in radial direction through the wall of the wind-up sleeve and forms a bridge portion extending parallel to the outside of said sleeve, said bridge connecting the element having holes with another washer, the two washers being located, each outside of the respective ends of the inertial body member, whereby the yoke grips the same and the intermediately located portion of the sleeve while at the same time serving as a carrier for a portion of the safety belt threaded under the bridge portion and around the outer periphery of the sleeve.

7. A device according to claim 4, wherein the coupling means when the safety belt is in a normal condition of use, is stationary and said fingers engage the openings of the element provided with holes.

8. A device according to claim 4, wherein the coupling means when the safety belt is in the normal condition of use, is carried along by the rotating movement of the inertial body and while in activated condition engages the openings of the element provided with holes.

9. A device according to claim 8, wherein the means for axial displacement of the coupling means comprises a ratchet wheel which during normal operating conditions of the safety belt rotates with the shaft of a motor driving said inertial body, an oblique surface of said ratchet wheel abutting a corresponding oblique surface of the coupling element, whereby the axial displacement is brought about by braking of the ratchet wheel causing a displacement between the oblique surfaces.

10. A device according to claim 9, wherein braking of the ratchet wheel is accomplished by an electromagnetically controlled pawl.

* * * * *